United States Patent
Kamath et al.

(10) Patent No.: US 9,811,478 B2
(45) Date of Patent: *Nov. 7, 2017

(54) SELF-ENCRYPTING FLASH DRIVE

(71) Applicant: Mangstor, Inc., Austin, TX (US)

(72) Inventors: Ashwin Kamath, Cedar Park, TX (US);
Paul E. Prince, Lago Vista, TX (US);
Trevor Smith, Austin, TX (US)

(73) Assignee: Mangstor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,106

(22) Filed: Mar. 22, 2016

(65) Prior Publication Data
US 2016/0204931 A1 Jul. 14, 2016

Related U.S. Application Data

(63) Continuation of application No. 14/191,687, filed on Feb. 27, 2014, now Pat. No. 9,304,941.

(51) Int. Cl.
*G06F 12/14* (2006.01)
*H04L 9/06* (2006.01)
(Continued)

(52) U.S. Cl.
CPC ...... *G06F 12/1408* (2013.01); *G06F 12/0246* (2013.01); *H04L 9/0618* (2013.01);
(Continued)

(58) Field of Classification Search
CPC ... H04L 9/0618; H04L 9/0897; H04L 9/0637; G06F 12/1408; G06F 12/0246; G06F 2212/72
See application file for complete search history.

(56) References Cited

U.S. PATENT DOCUMENTS 8,010,790 B2 8/2011 Lee et al.
9,304,941 B2* 4/2016 Kamath .............. G06F 12/0246
(Continued)

OTHER PUBLICATIONS

Huachun et al., ("Study on Hardware Protection Technique of Flash Disk", Aug. 2007, 8th International Conference on Electronic Measurement and Instruments, pp. 3-55-3-59.*
(Continued)

*Primary Examiner* — Kenneth Chang
(74) *Attorney, Agent, or Firm* — Sean S. Wooden; Andrews Kurth Kenyon LLP

(57) ABSTRACT

Exemplary methods are provided for storing data in a flash storage device to facilitate subsequent detection of tampering, comprising receiving a plaintext; reading first metadata associated with a device sector; encrypting the plaintext based on the first metadata to generate a cipher text and first authentication data; storing the cipher text in the sector; and storing the first authentication data as second metadata associated with the sector. Exemplary methods are also provided for detecting tampering with data stored in a flash storage device, comprising determining a physical location in a device sector; reading cipher text from the physical location; reading first authentication data and maintenance metadata associated with the sector; decrypting the cipher text based on a user key and the maintenance metadata to generate second authentication data; and determining the occurrence of tampering based on the first and second authentication data. Memory devices embodying said methods are also provided.

20 Claims, 2 Drawing Sheets

(51) Int. Cl.
*H04L 9/08* (2006.01)
*H04L 9/32* (2006.01)
*G06F 12/02* (2006.01)

(52) U.S. Cl.
CPC .......... *H04L 9/0637* (2013.01); *H04L 9/0894* (2013.01); *H04L 9/0897* (2013.01); *H04L 9/3242* (2013.01); *G06F 2212/1052* (2013.01); *G06F 2212/2022* (2013.01); *G06F 2212/402* (2013.01); *G06F 2212/7201* (2013.01); *G06F 2212/7207* (2013.01)

(56) References Cited

U.S. PATENT DOCUMENTS

| | | |
|---|---|---|
| 2006/0282665 A1 | 12/2006 | Zhu et al. |
| 2007/0260891 A1 | 11/2007 | Starr et al. |
| 2008/0082834 A1 | 4/2008 | Mattsson |
| 2008/0117679 A1 | 5/2008 | Srinivasan et al. |
| 2009/0204778 A1* | 8/2009 | Marking .............. H04N 7/1675 711/163 |
| 2010/0027783 A1 | 2/2010 | Yup |
| 2010/0169669 A1* | 7/2010 | Smith ................. G06F 21/6218 713/193 |
| 2011/0154023 A1* | 6/2011 | Smith .................... G06F 21/78 713/155 |
| 2012/0278635 A1 | 11/2012 | Hars et al. |
| 2012/0297188 A1* | 11/2012 | van der Linden .... G06F 21/602 713/165 |
| 2013/0254459 A1 | 9/2013 | LaPlace et al. |
| 2013/0268728 A1* | 10/2013 | Ramanujan ........ G11C 14/0045 711/105 |

OTHER PUBLICATIONS

Butler et al., Disk-Enabled Authenticated Encryption, May 2010, 2010 IEEE 26th Symposium on Mass Storage Systems and Technologies, pp. 1-6.

Cryptography Stack Exchange, Why should I use Authenticated Encryption instead of just encryption?, http://crypto.stackexchange.com/questions/12178/why-should-i-use-authenicated-encryption-instead-of-just-encryption, pp. 104 (Dec. 10, 2013).

Wikipedia, Authenticated Encryption, http://en.wikipedia.org/wiki/Authenticated_encryption, pp. 1-3 (Jan. 6, 2014).

* cited by examiner

SELF-ENCRYPTING FLASH DRIVE

CROSS-REFERENCE TO RELATED APPLICATION(S)

This application is a continuation of, and claims the benefit of priority from, U.S. patent application Ser. No. 14/191,687 filed on Feb. 27, 2014, the entire disclosure of which is incorporated herein by reference.

FIELD

Secure hard drives are a class of disk drives that implement various security features to protect stored user data. Self-Encrypting Drives (SED) are a particular class of secure disk drives that automatically encrypt data as they are being written, and conditionally decrypt data as they are being read from the drive.

The contents of an SED is always encrypted and the encryption keys are themselves encrypted and protected in hardware. Because disk encryption is handled in the drive itself, the overall system performance is not affected or subject to attacks targeting other components of the system.

Due to heightened threat to data privacy and security, SEDs are viewed as an increasingly vital tool in combating data loss and theft. Designing SEDs poses technical challenges on how the encryption and decryption process can be performed.

SUMMARY

A method comprises receiving a plaintext message (m), encrypting the plaintext message and generating a cipher text (c) and authentication data (t), storing the cipher text in a user data portion of a data storage device, and storing the authentication data in a metadata portion of the data storage device.

A method comprises receiving an initialization vector (IV), receiving a key (k), reading cipher text (c) from a user data portion of a flash storage device, reading authentication data (t) from a metadata portion of the flash storage device, and decrypting the cipher text using the initialization vector, the key, and the authentication data, and generating plaintext (m).

A flash storage device comprises a memory space configured for storing user data, a memory space configured for storing metadata, an encryption module adapted to receive plaintext (m), a key (k), an authentication tag (t), and an initialization vector (IV) to encrypt the plaintext to generate a cipher text (c), and the flash memory device configured to store the cipher text in the user data portion of the flash storage device, and store the authentication tag in the metadata portion of the flash storage device.

DETAILED DESCRIPTION

There are a number of data encryption algorithms in use today, for instance AES (Advanced Encryption Standard), TLS (Transport Layer Security), and other algorithms such as authenticated encryption where an encryption algorithm is combined with a Message Authentication Code (MAC) to provide data confidentiality (privacy) as well as protection from message tampering to additionally provide data integrity (authenticity).

Flash storage devices have been recognized as an attractive data storage option for mobile computers and smartphone devices because of their small size, light-weight, shock resistance, fast access speed, and low power consumption. It is anticipated that with further advances in flash memory technology, its popularity may rival or even outpace hard disks. The flash memory device can be adapted to perform as a self-encrypting drive according to the present disclosure.

Figure 1:
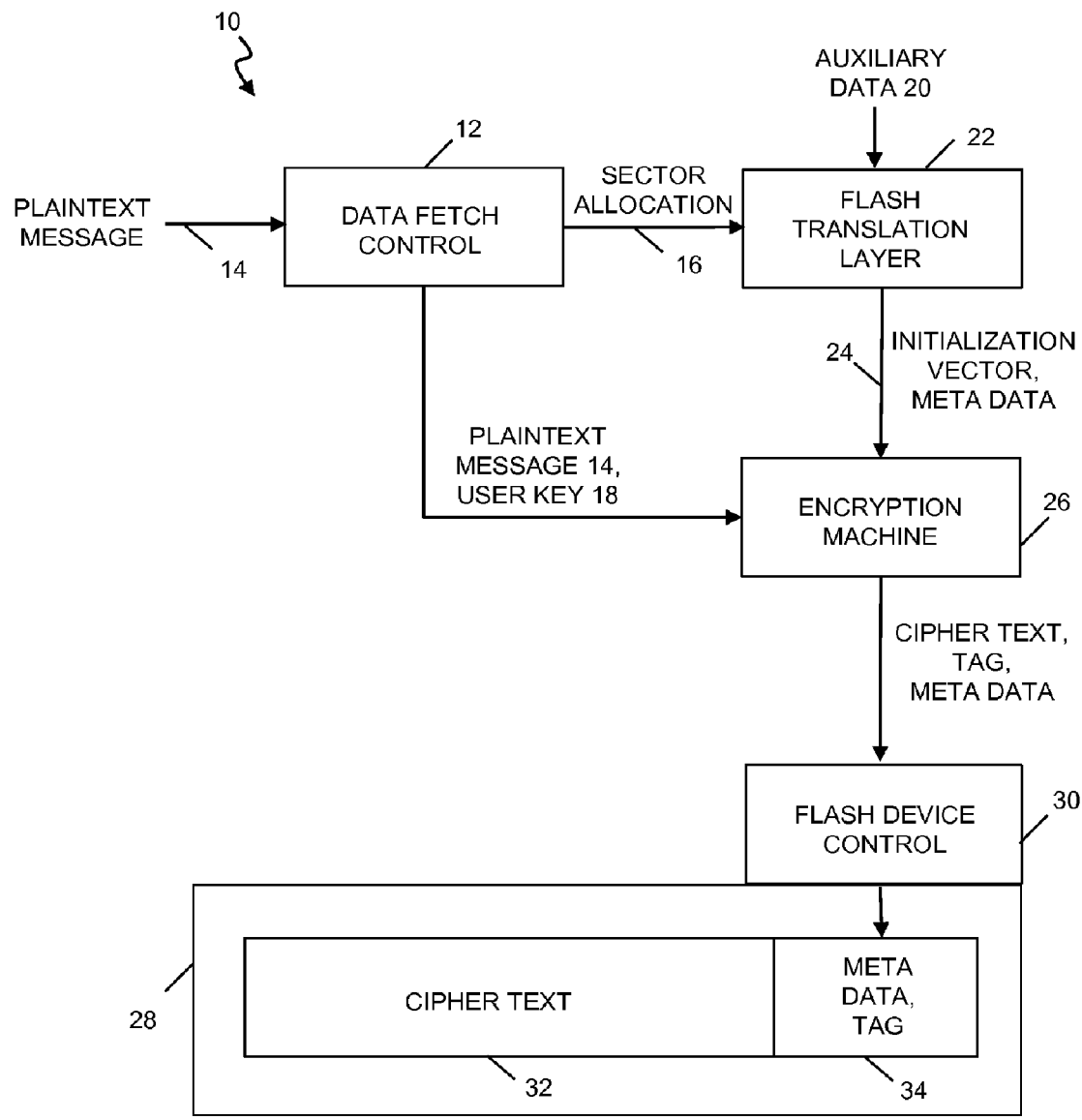
FIG. 1 is a simplified diagram illustrating a preferred embodiment of the encryption process according to the present disclosure.

FIG. 1 is a simplified diagram illustrating a preferred embodiment of the encryption process 10 for a flash storage device according to the present disclosure. A data fetch control block 12 receives the user's plaintext message (m) 14 to be stored in the flash storage device, and generates a sector allocation 16, and a user key (k) 18 along with the plaintext. The encryption key generally remains constant and it can be used to identify the user. The encryption key can be encrypted. Auxiliary data 20 such as the sector address combined with some function of an attribute of the flash block like its "age," for example, can be provided to a flash translation layer 22 to generate an initialization vector (IV). Other attributes such as utilization information and erase count may be used with or instead of age data. The primary function of the flash translation layer 22 is to perform a translation or mapping function in order to interface the linear flash memory with a file-based or sector-based system. The flash translation layer 22 is tasked with mapping between the logical block address (LBA) used by the host central processing unit (CPU) and the physical address locations in the flash storage device.

The following is a functional model of an authenticated encryption (AE) algorithm according to the present disclosure.

$$E(k,IV,m) \rightarrow (t,c),$$

where E is the encrypting machine, k is a user key, IV is a unique (random or pseudorandom) initial value (Initialization Vector) per message, m is the plaintext message to be encrypted, t is an authentication tag, and c is the resultant cipher text.

As shown in FIG. 1, the flash translation layer 22 is adapted to further generate an initialization vector (IV). The initialization vector is variable and dependent on the auxiliary data 20 so that the encryption is secure. Therefore, the auxiliary data is used to generate a unique initialization vector each time a sector is written. The flash translation layer 22 also generates metadata, which are stored in separate portions of the flash storage device. The metadata is used for flash maintenance functions per sector. The user plaintext 14, user key 18, initialization vector and metadata 24 are provided to an encryption machine 26. The encryption machine 26 is adapted to encrypt the user plaintext 14 using the user key 18, and initialization vector, to generate an output consisting of the cipher text 32, an authentication tag, t, and the metadata (unchanged) 34. The output from the encryption machine 26 is stored in the user data portion of the flash device 28 via a NAND flash device controller 30.

In flash storage device there is some amount of metadata that is available for flash maintenance functions per sector. A portion of the area used to store metadata can be set aside to store the authentication data or "tag" that is output from the encryption process. This authentication tag is used during decryption to detect and protect from third party tampering of user data.

Additionally, the metadata passes through the same encryption machine and is optionally not encrypted, and it may still be accounted for in the authentication tag. Thus, the metadata, whether encrypted or not, may be protected from tampering because any tampering will be detected by the decryption engine due to a mismatched authentication tag. A different embodiment may have the metadata hashed and optionally encrypted using a completely different key (k) and initialization vector, giving it a mutually exclusive level of confidentiality and integrity with respect to the user data.

The decryption machine inverts this process as follows:

$$D(k,IV,c,t) \to m \text{ OR NULL},$$

where D is the decrypting machine, IV is the same unique number used during encryption, c is the cipher text, t is the authentication tag, and m is the plaintext message. If the cipher text has been tampered with the decryption will output a "bottom" or "NULL" which implies that the decryption was not successful.

Figure 2:
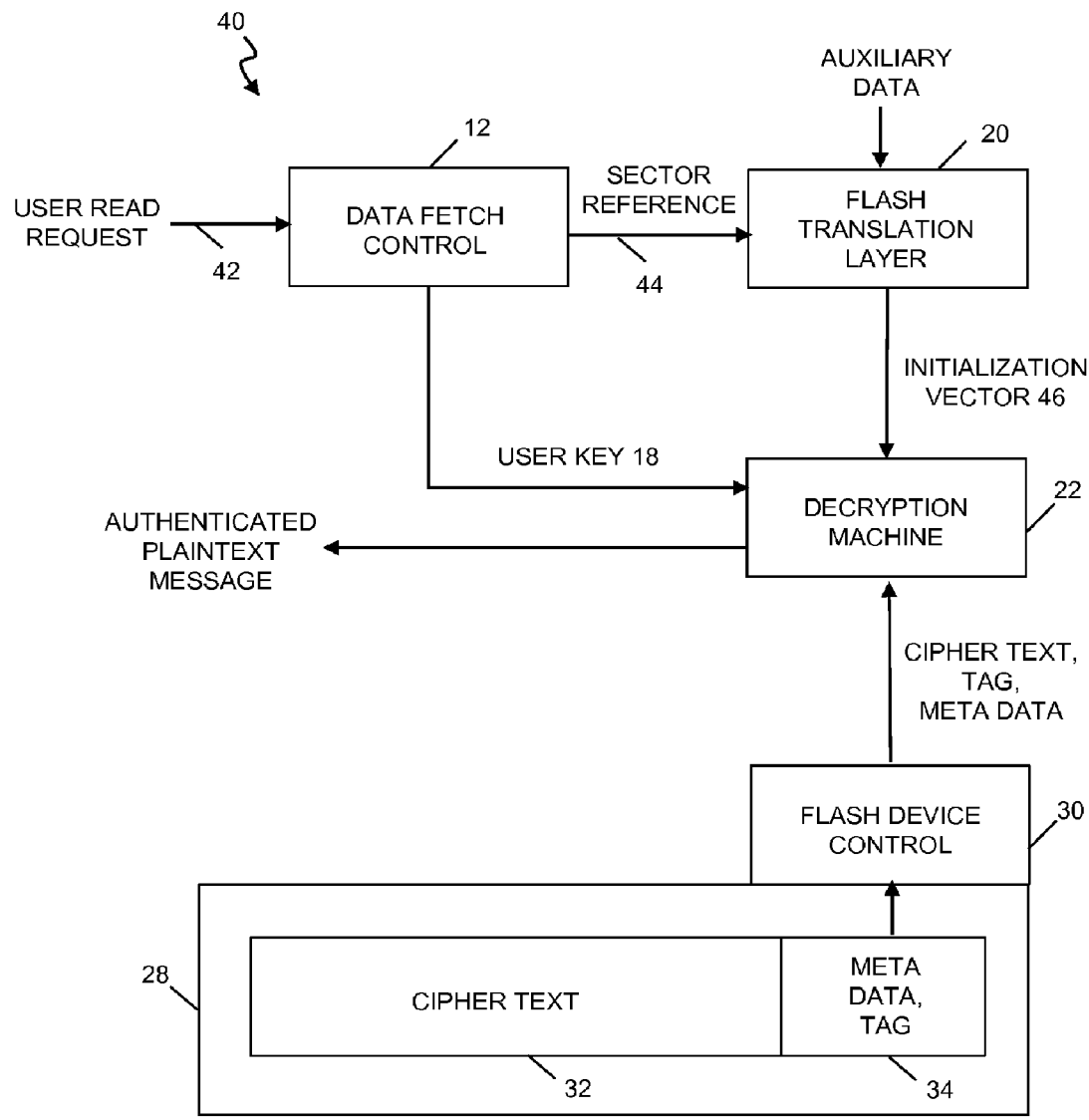
FIG. 2 is a simplified diagram illustrating a preferred embodiment of the decryption process according to the present disclosure.

FIG. 2 is a simplified diagram illustrating a preferred embodiment of a decryption process 40 for a flash storage device according to the present disclosure. A user read request 42 is received by the data fetch control block 12, which is adapted to generate the user key 18 and a sector reference 44 to the data. The flash translation layer 22 receives the auxiliary data or sector table information 20 as well as the sector reference 44, and generates an initialization vector 46 based on those data. The decryption machine 48 uses the user key 18, initialization vector 46, along with the authentication tag and metadata 34 stored in the flash device 28 to decipher the encrypted data or cipher text 32. As stated above, the authentication tag is primarily used to detect data tampering. If there is a mismatch of the authentication tag, the decryption machine outputs null or error that indicates unsuccessful deciphering.

The features of the present invention which are believed to be novel are set forth below with particularity in the appended claims. However, modifications, variations, and changes to the exemplary embodiments described above will be apparent to those skilled in the art, and the self-encrypting flash drive described herein thus encompasses such modifications, variations, and changes and are not limited to the specific embodiments described herein.

What is claimed is:

1. A method for storing data in a flash storage device to facilitate subsequent detection of tampering, comprising:
   receiving a plaintext comprising user data;
   reading first metadata associated with a sector of the flash storage device;
   encrypting the plaintext based on the first metadata to generate a cipher text and first authentication data;
   storing the cipher text in the sector of the flash storage device; and
   storing the first authentication data as second metadata associated with the sector of the flash storage device.

2. The method of claim 1, further comprising:
   receiving a logical address for storing the at least a portion of the user data;
   mapping the logical address to a physical location in the sector of the flash storage device; and
   generating an initialization vector based at least partly on the physical location.

3. The method of claim 2, wherein generating the initialization vector is further based on at least one attribute of the flash storage device associated with the physical location.

4. The method of claim 3, wherein the at least one attribute comprises at least one of an age attribute, utilization information, and erase count.

5. The method of claim 1, wherein:
   the first metadata relates to flash storage device maintenance functions; and
   the first authentication data is usable to detect tampering of the cipher text and the first metadata.

6. The method of claim 1, further comprising:
   receiving an initialization vector and a user key; and
   encrypting the plaintext further based on the initialization vector and the user key.

7. A method for detecting occurrence of tampering with data stored in a flash storage device, comprising:
   determining a physical location in a sector of the flash storage device;
   reading cipher text from the physical location;
   reading metadata associated with the sector of the flash storage device, the metadata comprising first authentication data and sector maintenance metadata; and
   decrypting the cipher text based on a user key and the sector maintenance metadata to generate a plaintext and second authentication data;
   determining the occurrence of tampering based on the first authentication data and the second authentication data.

8. The method of claim 7, wherein determining a physical location comprises:
   receiving a logical address corresponding to encrypted user data to be read; and
   mapping the logical address to the physical location.

9. The method of claim 7, further comprising generating an initialization vector based on at least one attribute associated with the physical location, wherein the cipher text is decrypted further based on the initialization vector.

10. The method of claim 9, wherein generating an initialization vector is further based on the physical location.

11. The method of claim 9, wherein the one or more attributes comprise at least one of age, utilization information, and erase count, and physical location associated with one or more sectors of the flash storage device.

12. A memory device comprising:
   a memory configured in a plurality of sectors, each sector comprising storage for user data and for first and second metadata associated with the particular sector;
   an encryption machine configured to:
      receive plaintext, a user key, and first metadata associated with a sector of the memory; and
      encrypt the plaintext based on the user key and the first metadata to generate a cipher text and an authentication tag; and
   a memory controller configured to:
      store the cipher text as user data in the sector of the flash storage device; and
      store the authentication tag as second metadata associated with the sector of the flash storage device.

13. The memory device of claim 12, the memory controller is further configured to:
   receive a logical address corresponding to user data to be stored; and
   map the logical address to a physical location associated with the sector of the flash storage device.

14. The memory device of claim 12, wherein:
the memory controller is further configured to generate an initialization vector based on a function of one or more attributes of the flash storage device; and
the encryption machine is further configured to encrypt the plaintext based on the initialization vector.

15. The memory device of claim 14, wherein the one or more attributes comprises at least one of an age attribute; utilization information, and erase count.

16. A memory device comprising:
a memory configured in a plurality of sectors, each sector comprising storage for user data and for first and second metadata associated with the particular sector;
a memory controller configured to:
read cipher text from a physical location in a sector of the flash storage device;
read metadata associated with the sector of the flash storage device, the metadata comprising first authentication data and sector maintenance metadata; and
a decryption machine configured to:
receive the cipher text, a user key, and the metadata associated with the sector of the flash storage device;
decrypt the cipher text based on the user key and the sector maintenance data to generate a plaintext and second authentication data; and
determine the occurrence of tampering based on the first authentication data and the second authentication data.

17. The memory device of claim 16, wherein the memory controller is further configured to determine the physical location by:
receiving a logical address corresponding to encrypted user data to be read; and
mapping the logical address to the physical location associated with the sector of the flash storage device.

18. The memory device of claim 17, wherein
the memory controller is further configured to generate an initialization vector based on a function of one or more attributes of the flash storage device; and
the decryption machine is further configured to decrypt the cipher text based on the initialization vector.

19. The memory device of claim 18, wherein the memory controller is further configured to generate the initialization vector based on the physical location.

20. The memory device of claim 16, wherein the memory controller is further configured to provide a flash translation layer.

* * * * *